US007450262B2

(12) United States Patent
Ikeda (10) Patent No.: US 7,450,262 B2
(45) Date of Patent: Nov. 11, 2008

(54) FORM RECOGNIZING APPARATUS, FORM RECOGNIZING METHOD, PROGRAM AND STORAGE MEDIUM

(75) Inventor: Hiroaki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 10/950,212

(22) Filed: Sep. 23, 2004

(65) Prior Publication Data

US 2005/0073721 A1    Apr. 7, 2005

(30) Foreign Application Priority Data

Oct. 6, 2003    (JP)    ............................. 2003-347688

(51) Int. Cl.
*G06K 9/68* (2006.01)
(52) U.S. Cl. ...................... 358/1.18; 358/453; 358/462; 382/199; 382/218; 382/219; 382/220
(58) Field of Classification Search ................ 358/1.18, 358/1.5, 453, 462; 382/199, 190, 195, 216, 382/218, 219, 220
See application file for complete search history.

(56) References Cited

U.S. PATENT DOCUMENTS 5,784,485 A * 7/1998 Xu et al. ..................... 382/156

| 6,606,402 | B2 * | 8/2003 | Wagman | 382/150 |
|---|---|---|---|---|
| 7,047,238 | B2 * | 5/2006 | Tada et al. | 707/5 |
| 7,319,791 | B1 * | 1/2008 | Baldo et al. | 382/219 |
| 2002/0178135 | A1 * | 11/2002 | Tanaka | 707/1 |

FOREIGN PATENT DOCUMENTS

| JP | 10-269311 A | 10/1998 |
|---|---|---|
| JP | 2000-285187 A | 10/2000 |

* cited by examiner

*Primary Examiner*—Edward L Coles
*Assistant Examiner*—Chan S Park
(74) *Attorney, Agent, or Firm*—Canon U.S.A. Inc., I.P. Division (57) ABSTRACT

A form recognizing apparatus, a form recognizing method and a form recognizing program for easily and precisely recognizing whether or not a form including multiple pages corresponds to any of multiple registered forms are disclosed. A form is registered. The registered form includes a feature amount and weight information of each page of the registered form. A page similarity value of each page of each of the registered forms is calculated by comparing a feature amount of each page of an input form image to be recognized and a feature amount of the corresponding page of the registered form. A form similarity value between the input form image to be recognized and each of the registered forms is calculated by weighting the page similarity values of the calculated pages by using weight information of the registered pages. A registered form corresponding to the form image to be recognized is determined.

21 Claims, 8 Drawing Sheets

| PAGE | ID1 | | ID2 | |
|---|---|---|---|---|
| | WEIGHT | SIMILARITY | WEIGHT | SIMILARITY |
| 1 | 0.3 | 98 | 0.1 | 85 |
| 2 | 0.5 | 82 | 0.1 | 82 |
| 3 | 0.2 | 80 | 0.8 | 96 |
| WEIGHTED TOTAL | 86.4 | | 93.5 | |

FIG. 8

STORAGE MEDIUM

| DIRECTORY INFORMATION |
|---|
| FIRST DATA PROCESSING PROGRAM<br>PROGRAM CODE CORRESPONDING TO STEPS IN FLOWCHART SHOWN IN FIG. 2 |
| SECOND DATA PROCESSING PROGRAM<br>PROGRAM CODE CORRESPONDING TO STEPS IN FLOWCHART SHOWN IN FIG. 3 |
| THIRD DATA PROCESSING PROGRAM<br>PROGRAM CODE CORRESPONDING TO STEPS IN FLOWCHART SHOWN IN FIG. 4 |
| |

FIG. 9

FORM RECOGNIZING APPARATUS, FORM RECOGNIZING METHOD, PROGRAM AND STORAGE MEDIUM

CROSS REFERENCE TO RELATED APPLICATIONS

This application claims priority from Japanese Patent Application No. 2003-347688 filed on Oct. 6, 2003, which is hereby incorporated by reference herein.

BACKGROUND OF THE INVENTION

1. Field of the Invention

The present invention relates to a form recognizing apparatus, method, program and storage medium for automatically recognizing forms.

2. Description of the Related Art

Form recognition for automatically categorizing forms into registered formats is a significantly effective method for performing processes of inputting and categorizing a large amount of forms.

In the inputting and categorizing processes, a feature amount is extracted from data of a form image read through a scanner, for example, and form format data is created. Then, a similarity in format data is calculated between the input form and registered forms, and the registered form having the highest similarity is output as the recognition result.

A similarity in format data may be determined by referring to tables in forms and calculating a similarity value based on a ratio of a form area on one page to a total of areas of tables included on the page as disclosed in Japanese Patent Laid-Open No. 2000-285187, for example.

However, in the form recognition processing as disclosed in Japanese Patent Laid-Open No. 2000-285187, a subject is limited to a one-page form, which may cause an inconvenience.

On the other hand, multiple forms may be continuously read as disclosed in Japanese Patent Laid-Open No. 10-269311, for example. According to Japanese Patent Laid-Open No. 10-269311, a partition form is provided in advance between processing units to be processed at one time. Then, when the form group is read and every time the partition form is read, the output of the subsequent reading result is changed. Furthermore, the form only immediately after the partition form is used to identify the format type.

However, in the recognition processing as disclosed in Japanese Patent Laid-Open No. 10-269311, a partition form must be created and be provided in advance between processing units, which complicates the processing. Furthermore, since the form only immediately after a partition form is used to identify the format, it is highly likely that misrecognition may occur.

SUMMARY OF THE INVENTION

The present invention provides a form recognizing apparatus, a form recognizing method and a form recognizing program for easily and precisely recognizing a form including multiple pages.

According to one aspect of the invention, a form recognizing apparatus for recognizing whether or not an input form image including multiple pages corresponds to any of multiple registered forms is provided. The apparatus includes: a registration unit for registering a feature amount and weight information of each page for each of the registered forms; a page similarity calculation unit for calculating a page similarity value of each page of each of the registered forms by comparing a feature amount of each page of the input form image and the feature amount of a corresponding page of each of the registered forms registered by the registration unit; a form similarity calculating unit for calculating a form similarity value between the input form image and each of the registered forms by weighting the page similarity values of each page calculated by the page similarity calculation unit by using weight information of each page of each registered form registered by the registration unit; and a registered form determination unit for determining a corresponding registered form corresponding to the input form image based on the form similarity values of each of the registered forms calculated by the form similarity calculating unit.

According to another aspect of the invention, a form recognizing method for recognizing whether or not an input form image including multiple pages corresponds to any of multiple registered forms is provided. The method includes: registering a feature amount and weight information of each page for each of the registered forms; calculating a page similarity value of each page of each of the registered forms by comparing a feature amount of each page of the input form image and the feature amount of a corresponding page of each of the registered forms; calculating a form similarity value between the input form image and each of the registered forms by weighting the page similarity values of each page by using weight information of each page of each registered form; and determining a corresponding registered form corresponding to the input form image based on the form similarity values of each of the registered forms.

According to another aspect of the invention, a form recognizing program including program code for causing a computer to recognize whether or not an input form image including multiple pages corresponds to any of multiple registered forms is provided. The program code includes instructions for: registering a feature amount and weight information of each page for each of the registered forms; calculating a page similarity value of each page of each of the registered forms by comparing a feature amount of each page of the input form image and the feature amount of a corresponding page of each of the registered forms; calculating a form similarity value between the input form image and each of the registered forms by weighting the page similarity values of each page by using weight information of each page of each registered form; and determining a corresponding registered form corresponding to the input form image based on the form similarity values of each of the registered forms.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

A first embodiment of a form recognizing apparatus is described next with reference to drawings.

Form Recognizing Apparatus

Figure 1:
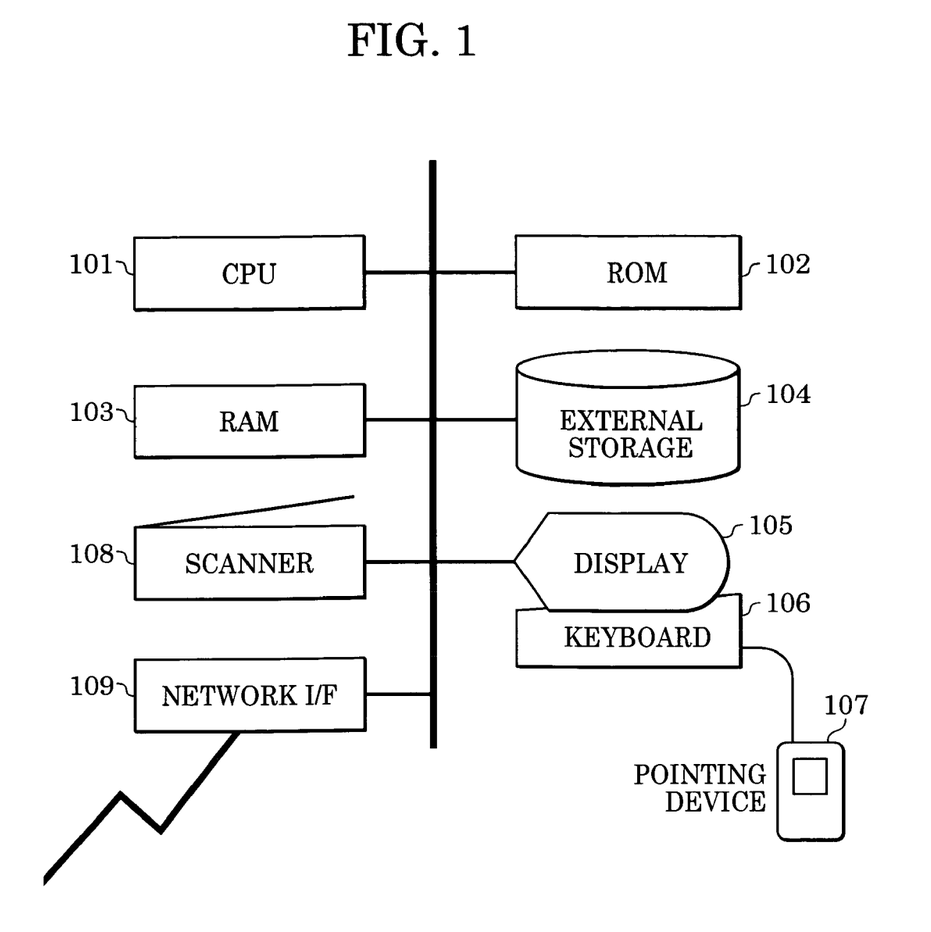
FIG. 1 is a block diagram showing a form recognizing apparatus.

FIG. 1 is a block diagram showing a first embodiment of a form recognizing apparatus. In FIG. 1, a form recognizing apparatus includes an external storage apparatus 104, such as a magnetic disk, and an image scanner 108. The form recognizing apparatus reads image data of forms from the external storage apparatus 104 or reads forms through the image scanner 108.

The form recognizing apparatus also includes a CPU 101 for overall control. A control program of the CPU 101 is stored in a read-only memory (ROM) 102. Form images input using the image scanner 108 are held in a random-access memory (RAM) 103. A process for form recognition is executed by the control program within the ROM 102.

Feature amounts for form recognition are stored in the ROM 102 or may be read from the external storage apparatus 104 to the RAM 103.

Upstream processes, such as noise removal, may be executed as required before form recognition.

The form recognizing apparatus shown in FIG. 1 includes a display 105, a keyboard 106, a pointing device 107, such as a mouse, and a network interface 109. The network interface 109 allows communication with a remote apparatus (not shown) to exchange programs, recognition dictionaries, data and so on.

The invention can be implemented by a generic computer. In this case, the control program to be provided by a medium, for example, may be stored in the external storage apparatus 104 and be executed by the CPU 101 in response to an instruction from an operator.

The form recognizing apparatus may be connected to the image scanner 108 and/or the display 105 through an interface.

A form recognizing method to be implemented in the form recognizing apparatus shown in FIG. 1 is described next with reference to the flowcharts in FIGS. 2 and 3.

Form Registration Process

Figure 2:
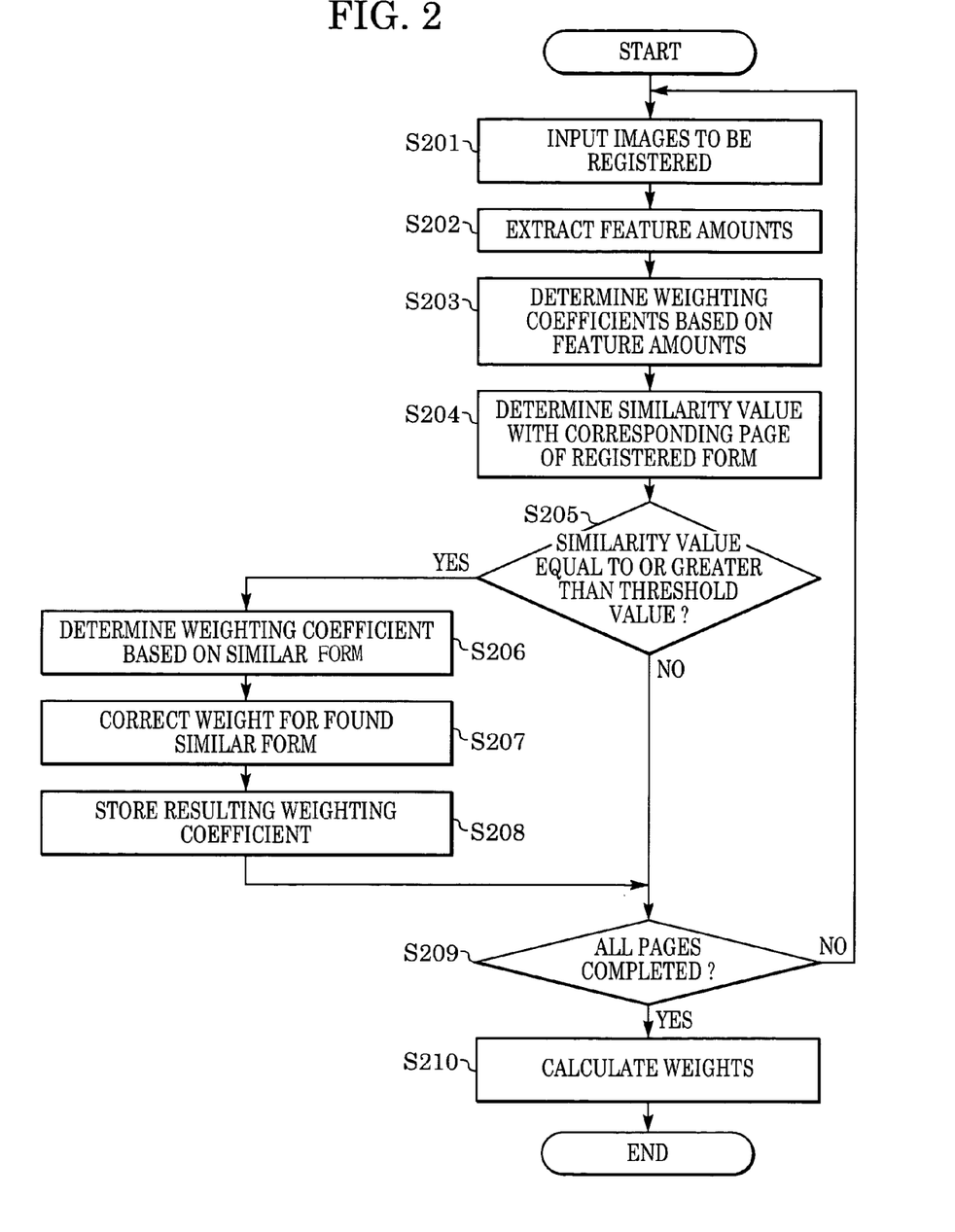
FIG. 2 is a flowchart illustrating a registration process in the form recognizing apparatus shown in FIG. 1.
Figure 3:
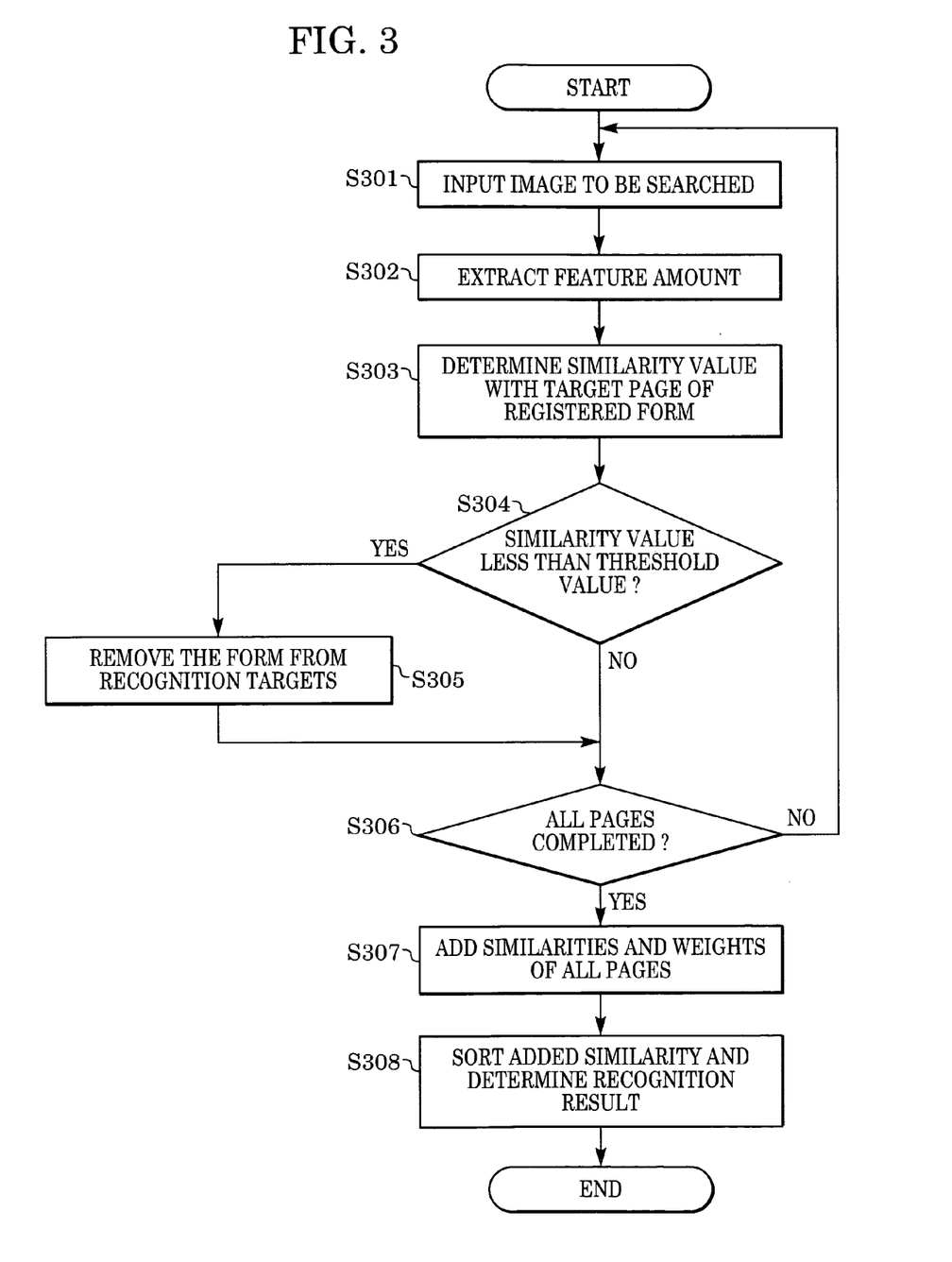
FIG. 3 is a flowchart illustrating a recognition process in the form recognizing apparatus shown in FIG. 1.

FIG. 2 is a flow chart that shows a process for additionally registering a form as a registered form (template) with the form recognizing apparatus. First, at step S201, form images having multiple pages to be registered are sequentially input, for example through the image scanner 108. At step S202, feature amounts of the form images on the input pages are extracted. For example, a size, position and number of a table frame in a form or a number of cells in a table frame may be extracted.

Next, processing proceeds to step S203 where the feature amounts extracted at step S202 are used to determine and store weighting coefficients.

Figure 5:
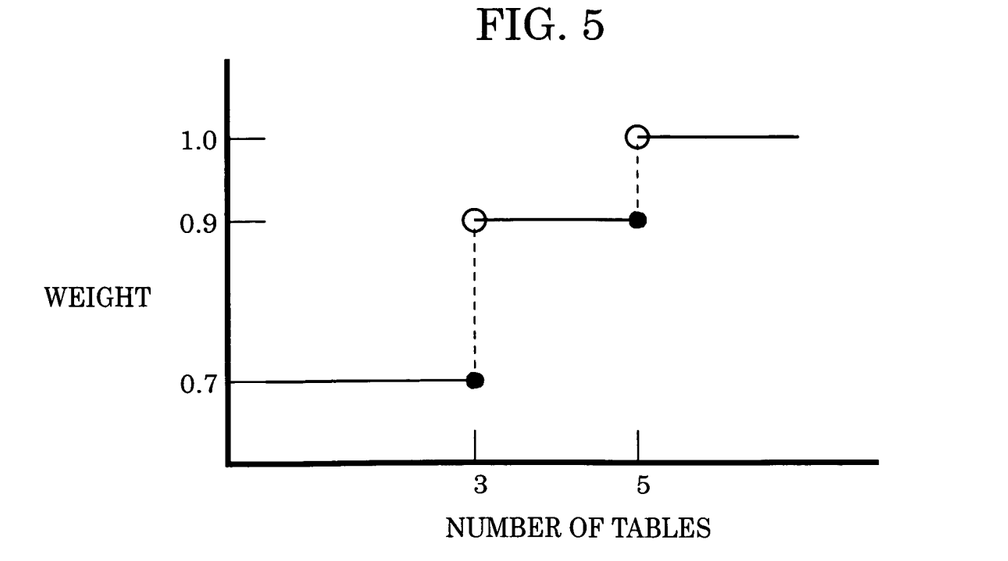
FIG. 5 is a graph showing a relationship between numbers of tables and weights in the form recognizing apparatus shown in FIG. 1.

In order to determine weighting coefficients based on feature amounts, as the number of tables on one page of form images increases, the identifying ability may be increased. For example, as shown in FIG. 5, when the number of tables on one page is six or more, the weight is "1", when four or five tables are included on one page, the weight is "0.9", and when three or fewer tables are included on one page, the weight is "0.7".

Next, at a step S204, the feature amounts are used to determine similarities with the same pages of all forms (registered forms), that have already been registered with the external storage apparatus 104. An exemplary method for calculating similarities is described in Japanese Patent Laid-Open No. 2000-285187.

The existence of a registered form having a similar page as the corresponding page of the input form means the existence of multiple similar registered forms in the subsequent recognition process. Thus, the sorting becomes difficult, which may cause misrecognition. Therefore, a small weight is defined for the page so as to decrease the similarity of the input form.

In other words, at step S205, a registered form having a maximum similarity is searched through all registered forms, and it is determined whether the similarity value is equal to or greater than a threshold value.

If it is determined at step S205 that the similarity value is less than the threshold value, the process moves to step S209.

Figure 6:
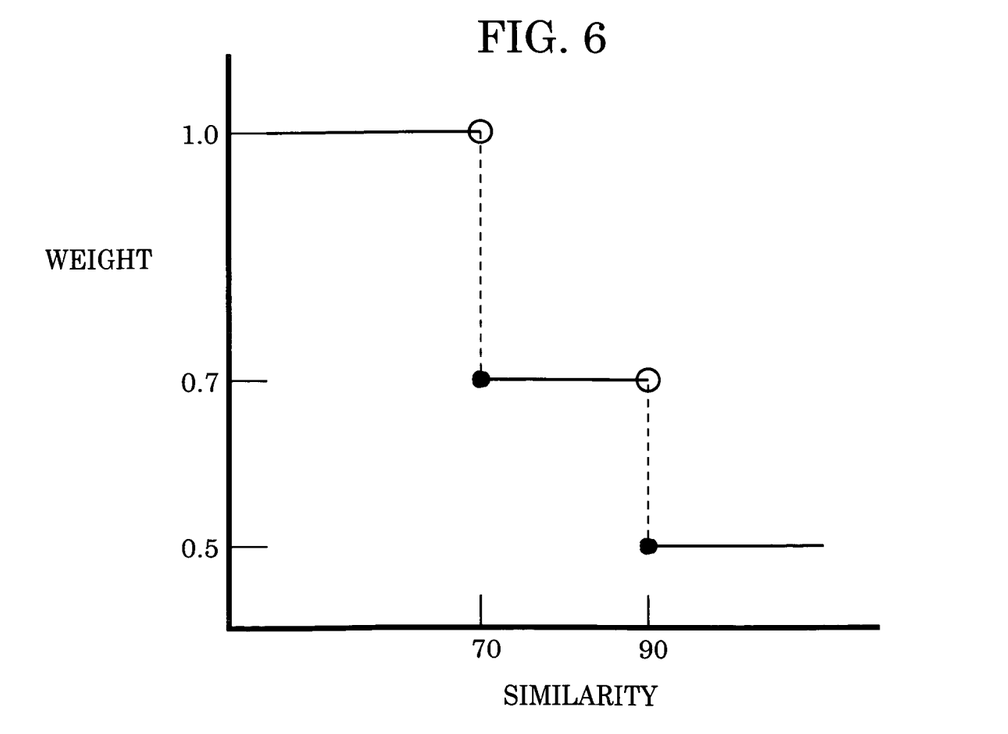
FIG. 6 is a graph showing a relationship between similarities and weights in the form recognizing apparatus shown in FIG. 1.

On the other hand, if it is determined at step S205 that the similarity value is equal to or higher than the threshold value, the process moves to step S206. At step S206, a weighting coefficient is determined based on the similar form. For example, as shown in FIG. 6, when the maximum similarity value is 100 and when a registered form having the similarity value of 90 or higher exists, the weighting coefficient is 0.5 times, when a registered form having the similarity value of between 70 and 90 exists, the weighting coefficient is 0.7 times, and when the similarity value is lower than 70, the weighting coefficient is 1.0 times.

Figure 4:
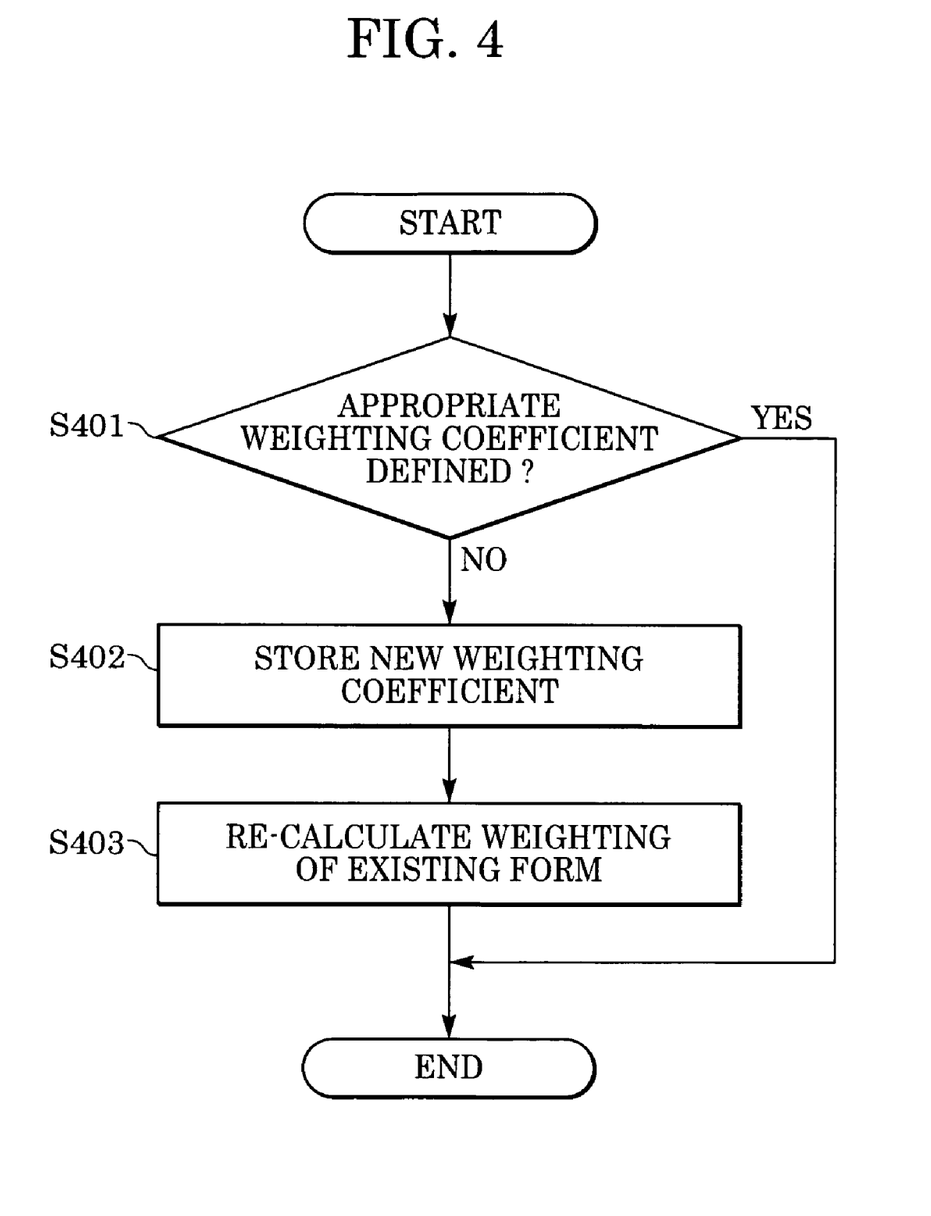
FIG. 4 is a flowchart illustrating a weight correction process in the form recognizing apparatus shown in FIG. 1.

The process proceeds from step S206 to step S207, and a weight is corrected so as to decrease the similarity value of a corresponding page of a similar registered form. Thus, when a new similar form is subsequently input, weights for a target page of not only the newly registered form but also the registered form can be corrected by using a weighting coefficient based on a similar form. Thus, the misrecognition can be prevented. An exemplary process for correcting weights found in similar forms is shown in FIG. 4 and described later.

The process moves from step S207 to step S208 where the similar-form-based weighting coefficient resulting from the step S206 for the input page of the input form to be registered is stored in the external storage apparatus 104.

Next, at a step S209, it is determined whether or not all pages have been processed. If all pages have not been processed, processing returns to step S201. On the other hand, if it is determined at step S209 that all pages have been processed, the "feature-amount-based weighting coefficient" and "similar-form-based weighting coefficient" stored at the steps S203 and S208 are used to calculate weights of each of the pages at a step S210. The registration process then ends.

Weight Correction Process

The weight correction process on a registered similar form to be performed at step S207 of FIG. 2 is executed by steps shown in FIG. 4 and described next.

First, at step S401, it is determined whether an appropriate weighting coefficient is defined for the page of a registered form similar to a target page of an input form. For example, when the similarity value between the corresponding page of the registered form and the target page of the input form is "70", the "similar-form-based weighting coefficient" of the corresponding page of the registered form is 0.7 (see FIG. 6). When the "similar-form-based weighting coefficient" is 0.7, no correction is required.

If appropriate weighting coefficients have been defined (yes in step S401), the weight correction process of FIG. 4 ends. On the other hand, if the weight for the corresponding page of the registered form must be corrected (no in step S401), a new "similar-form-based weighting coefficient" is stored at step S402. Then, at step S403, weights for all pages of the input form and registered form are recalculated. Then, the similarities are updated and the weight correction process of FIG. 4 ends.

In exemplary embodiments, the weight calculation at step S210 (of FIG. 2) and step S403 (of FIG. 4) is implemented as described next. A weight for each page is calculated by using the following equation:

$$\text{similar-form-based weighting coefficient} \times \text{feature-amount-based weighting coefficient} / \text{total of weighting coefficients of all pages} \quad (1)$$

For example, in registering an input form including three pages, when the first page of the input form is not similar to any pages of registered forms and has seven tables (with the page weighting coefficient of 1×1, as determined by using the values in the tables shown in FIGS. 5 and 6), the second page has a maximum similarity value of 93 with respect to a similar form and has four tables (with the page weighting coefficient of 0.5×0.9=0.45), and the third page is not similar to any pages of registered forms and has two tables (with the page weighting coefficient of 1×0.7=0.7), the total of the weighting coefficients of all the three pages is 1×1+0.5×0.9+1×0.7=2.15. Therefore, using the equation above, the weight for the first page is 1/2.15=0.47, the weight for the second page is 0.45/2.15=0.21 and the weight for the third page is 0.7/2.15=0.33.

While this process uses the numbers of tables and the similarities with existing registered forms as parameters for determining weights, other parameters, such as the number of cells in tables and similarities in character recognition on title fields, may be used.

Form Recognition Process

A form recognition process is described next with reference to the flowchart in FIG. 3.

First, at step S301, a form image to be recognized is input, for example, through the image scanner 108. At step S302, a feature amount of one page image (target page) of the input form is extracted.

Next, at step S303, a similarity value is calculated between the feature amount of the target page of the input form and the feature amount of the corresponding page of a registered form. At step S304, it is determined whether or not the similarity value calculated at step S303 is less than a threshold value.

If it is determined at step S304 that the similarity value is less than the threshold value (yes at step S304), the other pages of the registered form are not evaluated step S305 and the registered form is excluded from the similarity evaluation targets. Processing then proceeds to step S306.

On the other hand, if it is determined at step S304 that the similarity value is equal to or greater than the threshold value (no at step S304), processing proceeds to step S306 where it is determined whether the similarities of all pages have been evaluated. If it is determined at step S306 that not all pages have been evaluated (no at step S306), the process returns to step S301. On the other hand, if the similarities of all pages have been evaluated (yes at step S306), the process proceeds to step S307 where a weighted addition is performed on the similarities of all pages of each of the registered forms.

Finally, at step S308, the results of weighted additions of the similarities of the evaluated registered forms are sorted, and a registered form having the highest similarity is output as a recognition result.

Figure 7:
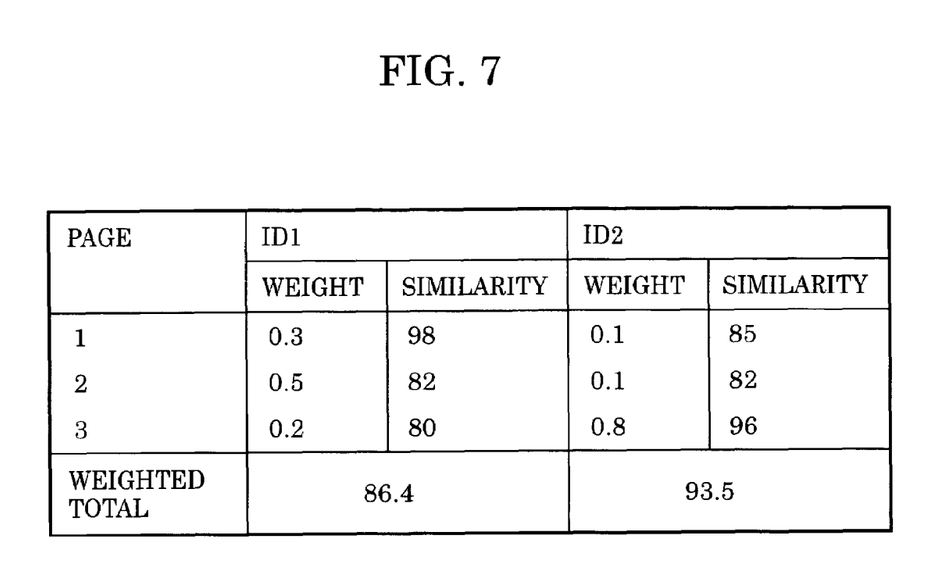
FIG. 7 is a table showing an example of a similarity evaluating method in the form recognizing apparatus shown in FIG. 1.

For example, as shown in FIG. 7, Registered Forms ID1 and ID2 are extracted as targets of similarity evaluations. In this case, the weights of Registered Form ID 1 are 0.3, 0.5 and 0.2 for the first to third pages, respectively. The weights of Registered Form ID 2 are 0.1, 0.1 and 0.8 for the first to third pages, respectively. The similarities of Registered Forms ID1 and ID2 with the input form to be recognized are 98 and 85, respectively, for the first pages, 82 and 82, respectively, for the second pages, and 80 and 96, respectively, for the third pages.

In this case, the similarity of Registered Form ID1 is 98×0.3+82×0.5+80×0.2=86.4. The similarity of Registered Form ID2 is 85×0.1+82×0.1+96×0.8=93.5. As a result, the similarity of ID2 is higher than that of ID1, and Registered Form ID2 is output as the recognition result.

As described above, according to the first embodiment, the similarities with other forms are used to determine weights. Thus, even when multiple registered forms have similar pages, a recognition process is performed by weighting a highly identifiable page. Therefore, precise recognition can be achieved.

Furthermore, the similarity calculation is terminated in the middle for a registered form including a page having a lower similarity value than a threshold value. Thus, the processing time can be reduced.

Furthermore, according to the first embodiment, a weight of a registered form can be automatically corrected in accordance with a similarity with a newly registered form. Thus, misrecognition can be prevented thereafter.

Figure 8:
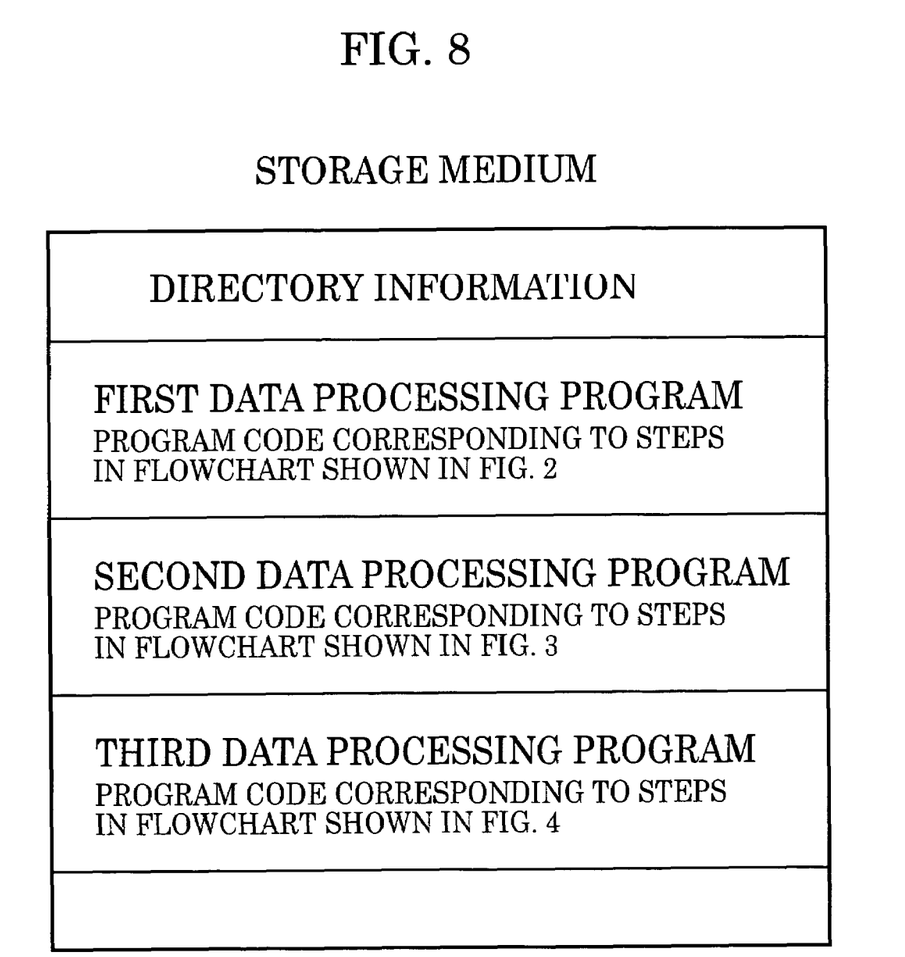
FIG. 8 is a diagram illustrating a memory map of a storage medium storing various data processing programs, which are readable by the form recognizing apparatus shown in FIG. 1.

FIG. 8 illustrates an exemplary memory map of a storage medium storing various data processing programs which are executable by a form recognizing apparatus according to the invention. A first area of the storage medium stores directory information. A second area of the storage medium stores program code corresponding to the steps of the flowchart in FIG. 2. A third area stores program code corresponding to the steps of the flowchart in FIG. 3. A fourth area stores program code corresponding to the steps of the flowchart in FIG. 4.

Data, such as a recognition dictionary (not shown), under each program may be managed in the directory. Programs for installing various programs in a computer may also be stored therein.

Second Embodiment

Figure 9:
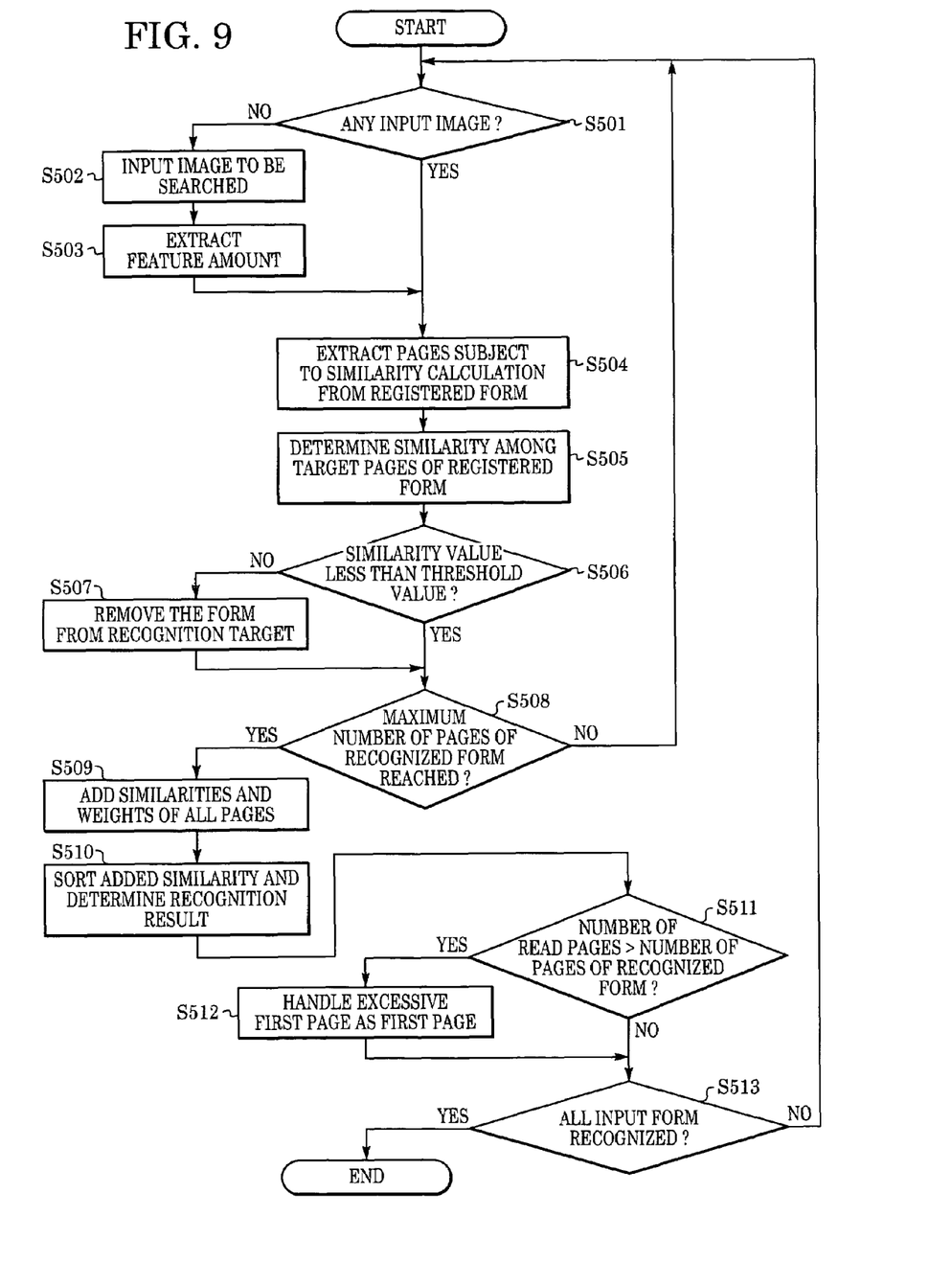
FIG. 9 is a flowchart showing a recognition process of a second embodiment of a form recognizing apparatus.

A second embodiment that may be implemented by the form recognizing apparatus shown in FIG. 1 is described next with reference to FIG. 9. FIG. 9 is a flowchart showing a recognition process according to the second embodiment of a form recognizing apparatus.

According to the second embodiment, multiple sets of forms having different numbers of pages can be recognized at once.

The registration process according to the second embodiment before the recognition process is the same as that of the first embodiment.

In FIG. 9, at step S501, it is determined whether any input page image exists or not. Such a page image includes an image on an excessive page (at step S512) and a page image from which the feature amount has been extracted. If an input page image (including an image on an excessive page at step S512) exists (yes in step S501), the process moves to step S504.

On the other hand, if an input page image does not exist (no in step S501), processing proceeds to step S502 where a form image on the next page is input. At step S503, a feature amount of the input form image is extracted.

At step S504, feature information of a page of each registered form corresponding to the page image of the input form to be calculated for the similarity is extracted. At a step S505, the feature amount of the page of the input form to be processed and the feature information of the corresponding page of each registered form are compared, and the similarity is calculated.

Next, at step S506, it is determined whether a registered form having the similarity value calculated at step S505 less than a threshold value. If the registered form has a similarity value less than the threshold value (yes at step S506), processing moves to step S507 where the registered form having similarity value less than the threshold value is excluded from the recognition targets. The subsequent page images do not undergo similarity calculation.

The process proceeds to step S508 where it is determined whether or not the number of pages of the input form that have undergone the similarity calculation is equal to or greater than the maximum number of pages of all registered forms to be recognized. If so (yes at step S508), the process moves to step S509. If not, the process returns to step S501 where the next page image is continuously processed.

At step S509, the similarities of pages of the registered forms calculated at steps S501 through S508 and the weights of the pages are used to perform weighted additions on the similarities of the registered forms. Next, at step S510, the results of the weighted addition of the similarities are sorted, and the recognition result is determined.

Processing proceeds to step S511 where the number of pages of the form image input at steps S501 through S508 and the number of pages of the registered form, which is the recognition result determined at the step S510, are compared. If it is determined in step S511 that the number of pages of the input form image is greater than the number of pages of recognized forms (yes at step S511), the process moves to step S512. Otherwise, the process proceeds to step S513. At the step S512, the excessive first page among the input form page images is handled as a first page.

At step S511, it is determined whether all input forms have been recognized. If so, the process ends. If any page images have not been recognized yet, the process returns to step S501.

As described above, according to the second embodiment, multiple sets of form images having different numbers of pages can be recognized. Furthermore, according to the second embodiment, multiple sets of form images can continuously be processed.

While these embodiments are implemented by a form recognizing apparatus, the embodiments may be implemented by an information processor such as a general personal computer and a work station by executing a computer-executable form recognizing program. Alternatively, the embodiments may be implemented by a multifunction apparatus for performing various processes such as processes by a copier and facsimile machine.

A server may perform registration/recognition processes on form images input from a client apparatus over a network and may return the results to the client apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretations so as to encompass all such modifications and equivalent structures and functions.

What is claimed is:

1. A form recognizing apparatus for recognizing whether or not an input form image including multiple pages corresponds to any of multiple registered forms, the apparatus comprising:
    registration means for registering a feature amount and weight information of each page for each of the registered forms;
    page similarity calculation means for calculating a page similarity value of each page of each of the registered forms by comparing a feature amount of each page of the input form image and the feature amount of a corresponding page of each of the registered forms registered by the registration means;
    form similarity calculating means for calculating a form similarity value between the input form image and each of the registered forms by weighting the page similarity values of each page calculated by the page similarity calculation means by using the weight information of each page of each registered form registered by the registration means; and
    registered form determination means for determining a corresponding registered form corresponding to the input form image based on the form similarity values of each of the registered forms calculated by the form similarity calculating means.

2. A form recognizing apparatus according to claim 1, wherein, when registering a respective form, the registration means determines the weight information based on feature amounts of pages of the respective form.

3. A form recognizing apparatus according to claim 1, wherein, when registering a respective form, the registration means determines the weight information based on page similarity values resulting from comparison between feature amounts of pages of the respective form and feature amounts of pages of registered forms excluding the respective form being registered.

4. A form recognizing apparatus according to claim 1, wherein, when registering a respective form, the registration means determines first weighting coefficient information based on feature amounts of pages of the respective form, determines second weighting coefficient information based on page similarity values resulting from comparison between feature amounts of pages of the respective form and feature amounts of pages of each of the registered forms, and calculates the weight information based on the first weighting coefficient and the second weighting coefficient.

5. A form recognizing apparatus according to claim 3, wherein the registration means further updates weight information of the respective form based on page similarity values resulting from comparison between feature amounts of pages of the respective form and feature amounts of pages of registered forms excluding the respective form.

6. A form recognizing apparatus according to claim 1, wherein a respective registered form determined by the page similarity calculation means as including a page having a lower page similarity value than a predetermined value is removed from targets to be compared with the input form image.

7. A form recognizing apparatus according to claim 1, wherein, if a number of pages of the corresponding registered form determined by the registered form determination means is greater than a number of pages of the input form image, an excessive page of the input form image is handled as at least a part of a next input form image to be recognized.

8. A form recognizing method for recognizing whether or not an input form image including multiple pages corresponds to any of multiple registered forms, the method comprising:

registering a feature amount and weight information of each page for each of the registered forms;

calculating a page similarity value of each page of each of the registered forms by comparing a feature amount of each page of the input form image and the feature amount of a corresponding page of each of the registered forms;

calculating a form similarity value between the input form image and each of the registered forms by weighting the page similarity values of each page by using the weight information of each page of each registered form; and determining a corresponding registered form corresponding to the input form image based on the form similarity values of the each of the registered forms.

9. A form recognizing method according to claim 8, wherein, when registering a respective form, the weight information is determined based on feature amounts of pages of the respective form.

10. A form recognizing method according to claim 8, wherein, when registering a respective form, the weight information is determined based on page similarity values resulting from comparison between feature amounts of pages of the respective form and feature amounts of pages of registered forms excluding the respective form being registered.

11. A form recognizing method according to claim 8, wherein, when registering a respective form, first weighting coefficient information is determined based on feature amounts of pages of the respective form, second weighting coefficient information is determined based on page similarity values resulting from comparison between feature amounts of pages of the respective form and feature amounts of pages of each of the registered forms, and the weight information is calculated based on the first weighting coefficient and the second weighting coefficient.

12. A form recognizing method according to claim 10, wherein weight information of the respective form is updated based on page similarity values resulting from comparison between feature amounts of pages of the respective form and feature amounts of pages of registered forms excluding the respective form.

13. A form recognizing method according to claim 8, wherein a respective registered form determined as including a page having a lower page similarity value than a predetermined value is removed from targets to be compared with the input form image.

14. A form recognizing method according to claim 8, wherein, if a number of pages of the corresponding registered form is greater than a number of pages of the input form image, an excessive page of the input form image is handled as at least a part of a next form image to be recognized.

15. A computer readable medium storing a form recognizing program including program code for causing a computer to recognize whether or not an input form image including multiple pages corresponds to any of multiple registered forms, the program code comprising instructions for:

registering a feature amount and weight information of each page for each of the registered forms;

calculating a page similarity value of each page of each of the registered forms by comparing a feature amount of each page of the input form image and the feature amount of a corresponding page of each of the registered forms;

calculating a form similarity value between the input form image and each of the registered forms by weighting the page similarity values of each page by using the weight information of each page of each registered form; and determining a corresponding registered form corresponding to the input form image based on the form similarity values of the each of the registered forms.

16. A computer readable medium storing a form recognizing program according to claim 15, wherein, when registering a respective form, the weight information is determined based on feature amounts of pages of the respective form.

17. A computer readable medium storing a form recognizing program according to claim 15, wherein, when registering a respective form, the weight information is determined based on page similarity values resulting from comparison between feature amounts of pages of the respective form and feature amounts of pages of registered forms excluding the respective form being registered.

18. A computer readable medium storing a form recognizing program according to claim 15, wherein, when registering a respective form, first weighting coefficient information is determined based on feature amounts of pages of the respective form, second weighting coefficient information is determined based on page similarity values resulting from comparison between feature amounts of pages of the respective form and feature amounts of pages of each of the registered forms, and the weight information is calculated based on the first weighting coefficient and the second weighting coefficient.

19. A computer readable medium storing a form recognizing program according to claim 17, wherein weight information of the respective form is updated based on page similarity values resulting from comparison between feature amounts of pages of the respective form and feature amounts of pages of registered forms excluding the respective form.

20. A computer readable medium storing a form recognizing program according to claim 15, wherein a respective registered form determined as including a page having a lower page similarity value than a predetermined value is removed from targets to be compared with the input form image.

21. A computer readable medium storing a form recognizing program according to claim 15, wherein, if a number of pages of the corresponding registered form is greater than a number of pages of the input form image, an excessive page of the input form image is handled as at least a part of a next form image to be recognized.

* * * * *